UNITED STATES PATENT OFFICE.

EDWARD G. WARD, OF JERSEY CITY, NEW JERSEY.

IMPROVEMENT IN DENTIFRICES.

Specification forming part of Letters Patent No. 196,275, dated October 16, 1877; application filed April 14, 1877.

*To all whom it may concern:*

Be it known that I, EDWARD G. WARD, of Jersey City, in the county of Hudson and State of New Jersey, have invented a new and useful compound, which I designate the "Cream of Chalk," for cleansing human teeth, which compound is fully described in the following specification.

My invention relates to that class of detergents desirable in connection with the practice of dentistry, as well as for popular toilet use; and consists, essentially, of an impalpable powder prepared from the liber or inner bark of an evergreen tree indigenous to the mountains of Chili, in South America, and common chalk.

This evergreen, ordinarily designated as the "soap-tree," possesses in a high degree the peculiar qualities of saponine, and when combined with chalk, as herein described, a dentifrice is produced of a most superior quality, effective in cleansing the teeth from all those impurities which accelerate their decay as well as produce foul breath.

The dentifrice which I have produced may be made by finely pulverizing the chalk and soap-bark, and then mixing them, the relative quantities of the two ingredients varying according as more or less of the soapy property of the soap-tree bark is desired. Ordinarily I employ three parts of the bark, by weight, with four parts of the chalk, by weight. I then mix and add a little sugar and orris or other flavoring substance.

Another mode of preparing my dentifrice is to extract the active principle of the bark, by maceration, percolation, boiling, or steeping, and the fluid thus obtained is then mixed with the pulverized chalk, which is then dried by evaporation, either with or without the aid of heat, and this done, the product is then reduced to powder, sugar and orris or other flavoring substance being added before such final reduction.

In either case the effect of the chalk is to cleanse the teeth and neutralize the destructive acids which result from the fermentation of decaying particles between them, while the other essential ingredient does even more, in that it produces a beautiful creamy lather which penetrates every recess of the mouth, and effectively cleanses its whole inner surface, thus leaving a feeling of freshness and cleanliness which no other substance with which I am acquainted can produce.

I am aware that a wash or fluid extract of the soap-tree has been used for washing silken and woolen stuffs, where it is desirable not to change their color, and that such wash has been used for cleansing and beautifying the hair, and that it has also sometimes been used as a febrifuge; but in such condition and for such purpose I do not employ such bark.

I am also aware that a dentifrice having ordinary soap and chalk as elements thereof is not new, and this I do not claim; but

What I claim as new, and desire to secure by Letters Patent, is—

A dentifrice composed of soap-tree bark, or the fluid extract thereof, in combination with pulverized chalk, substantially as and for the purpose described.

Witness my hand, in the matter of my application for a patent for a new and useful compound, which I designate the "Cream of Chalk," for cleansing human teeth, this 12th day of April, A. D. 1877.

EDWD. G. WARD.

Witnesses:
   SAML. DEWEY,
   C. P. HOPPER.